United States Patent
Kelso et al.

(10) Patent No.: US 9,423,891 B2
(45) Date of Patent: Aug. 23, 2016

(54) SHARED DIGITIZER

(71) Applicant: Lenovo (Singapore) Pte. Ltd., Singapore (SG)

(72) Inventors: Scott Edwards Kelso, Cary, NC (US); Robert A. Bowser, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 286 days.

(21) Appl. No.: 13/943,403

(22) Filed: Jul. 16, 2013

(65) Prior Publication Data

US 2015/0022458 A1 Jan. 22, 2015

(51) Int. Cl.
- *G06F 3/041* (2006.01)
- *G06F 3/0354* (2013.01)
- *G06F 1/16* (2006.01)
- *G06F 3/046* (2006.01)

(52) U.S. Cl.
CPC .......... *G06F 3/03545* (2013.01); *G06F 1/1616* (2013.01); *G06F 1/1643* (2013.01); *G06F 1/1692* (2013.01); *G06F 3/046* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2004/0125312 A1* | 7/2004 | You | ..................... | G02F 1/13338 349/149 |
| 2005/0062410 A1* | 3/2005 | Bell | ..................... | G02F 1/13471 313/506 |
| 2010/0289760 A1* | 11/2010 | Jonoshita | .............. | G06F 1/1626 345/173 |
| 2014/0049500 A1* | 2/2014 | Chen | ..................... | G06F 3/0412 345/174 |
| 2014/0055731 A1* | 2/2014 | Rihn | ..................... | G06F 3/0412 349/115 |
| 2014/0104185 A1* | 4/2014 | Hu | .......................... | G06F 3/044 345/173 |

OTHER PUBLICATIONS

Gu, M., "Cholesteric Liquid Crystal Reflective mode", http://www.personal.kent.edu/~mgu/LCD/chlc.htm, 2008 (2 pages).

Wacom, "EMR (Electro-Magnetic Resonance) Technology", http://www.wacom-components.com/english/technology/emr.html, 2007 (5 pages).

* cited by examiner

*Primary Examiner* — Adam R Giesy

(74) *Attorney, Agent, or Firm* — Brian J. Pangrle

(57) ABSTRACT

An apparatus can include a flat panel, a flat panel display, an electromagnetic digitizer panel disposed at least partially between the flat panel and the flat panel display and circuitry to digitize input signals from a flat panel side of the electromagnetic digitizer panel and to digitize input signals from a flat panel display side of the electromagnetic digitizer panel. Various other apparatuses, systems, methods, etc., are also disclosed.

20 Claims, 9 Drawing Sheets

SHARED DIGITIZER

TECHNICAL FIELD

Subject matter disclosed herein generally relates to equipment that includes an electromagnetic digitizer.

BACKGROUND

A computer may include an electromagnetic digitizer situated adjacent to a LCD display to make the LCD display a touch display (e.g., a touchscreen display), for example, where a stylus may be used to select items rendered to the LCD display. Various technologies and techniques described herein pertain to digitizers.

SUMMARY

An apparatus can include a flat panel, a flat panel display, an electromagnetic digitizer panel disposed at least partially between the flat panel and the flat panel display and circuitry to digitize input signals from a flat panel side of the electromagnetic digitizer panel and to digitize input signals from a flat panel display side of the electromagnetic digitizer panel. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
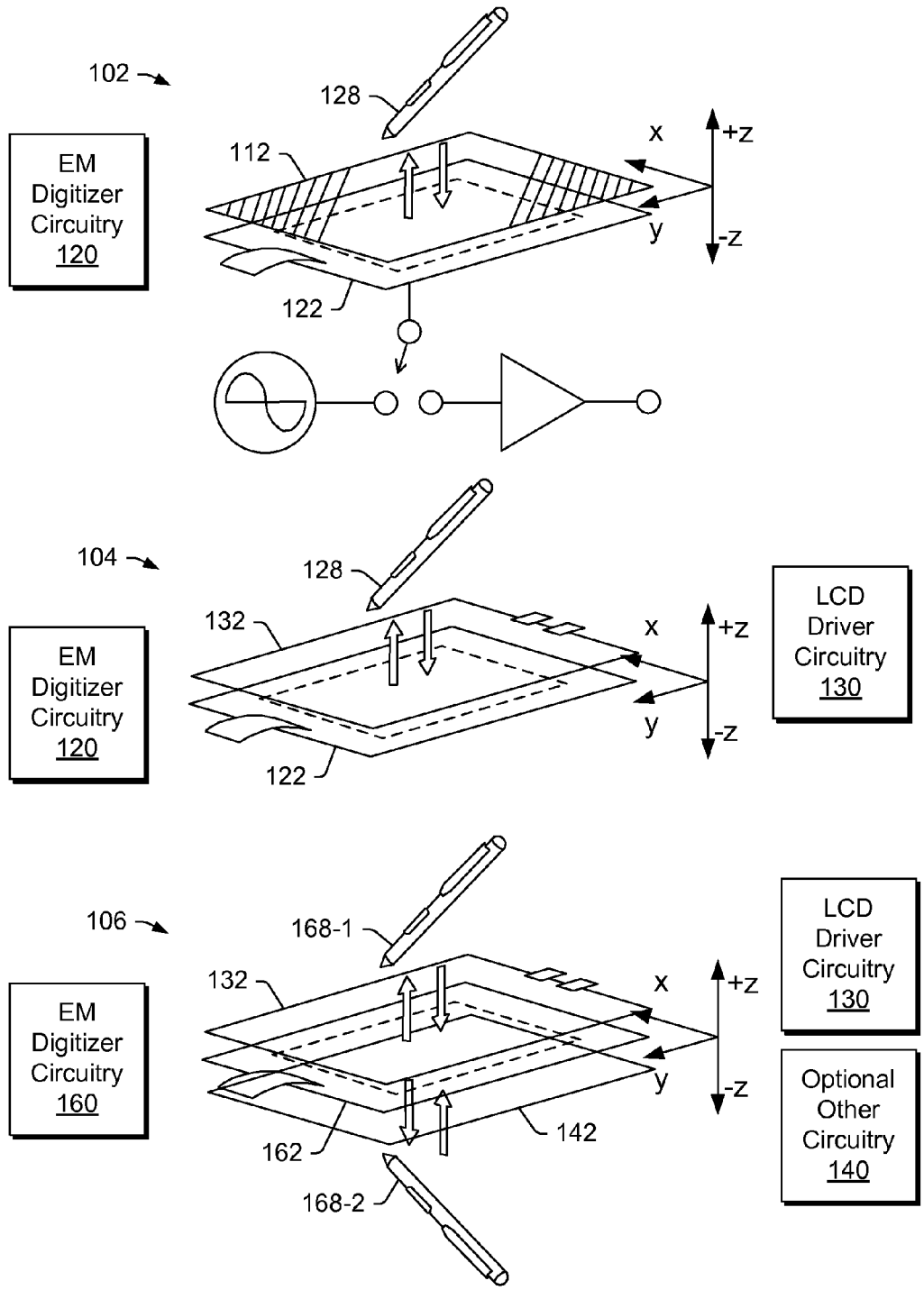
FIG. 1 is a diagram of examples of arrangements of panels that include an electromagnetic digitizer panel.

The following description includes the best mode presently contemplated for practicing the described implementations. This description is not to be taken in a limiting sense, but rather is made merely for the purpose of describing general principles of various implementations. The scope of invention should be ascertained with reference to issued claims.

Computing devices that include one or more processors, memory and a display may be characterized by one or more form factors. For example, various components of a computing device may have associated form factors (e.g., motherboard, chassis, etc.) and a computing device itself may have an associated form factor (e.g., notebook, tablet, etc.). As an example, a notebook computing device form factor may be specified as including an "A portion" (e.g., that includes a display) and a "B portion" (e.g., that includes a keyboard) where the two portions are coupled via one or more hinges or other mechanism and where each portion may be further specified by a length, a width and a height (e.g., or depth). As an example, a tablet computing device form factor may be specified by a length, a width and a height (e.g., or depth).

As an example, a computing device, whether a notebook, a tablet or other, can include an operating system stored in memory (e.g., as instructions) and executable by a processor (e.g., or processors) to create an operating system environment for running applications such as, for example, a word processing application, a drawing application, or other application where a user may input words, symbols, designs, etc. For example, when a user wants to record a note using a computing device, the user may press a button, move a mouse, touch a touchscreen, etc. to turn on or otherwise "wake" the computing device such that an application can execute in an operating system environment to place the computing device in an operational state for recording user input. In such an example, as a power-on process or waking process may take some time, the user has to wait before being able to record the note. Further, as an example, where a computing device with a notebook form factor is in a closed orientation (e.g., a closed clamshell orientation), a user may further need to manipulate the device to position it in an open orientation. Yet further, for some applications, a user may need to navigate to a desired application, launch it and index to a new or existing page (e.g., consider a "new file" operation). Various examples of technologies, techniques, etc. are described herein that may reduce wait time for recording notes, drawings, etc., especially when a computing device may be in an off or a low power state, for which it may take some time to wake the device.

As an example, a computing device can include a flat panel, a flat panel display, an electromagnetic digitizer panel disposed at least partially between the flat panel and the flat panel display and circuitry to digitize input signals from a flat panel side of the electromagnetic digitizer panel and to digitize input signals from a flat panel display side of the electromagnetic digitizer panel. In such an example, the flat panel, the flat panel display and the electromagnetic digitizer panel may be components of an A portion of a notebook form factor or, for example, they may be components of a tablet form factor.

As an example, given a computing device with an electromagnetic digitizer panel disposed at least partially between a flat panel and a flat panel display and circuitry to digitize input signals from a flat panel side of the electromagnetic digitizer panel and to digitize input signals from a flat panel display side of the electromagnetic digitizer panel, a user may use an appropriate stylus to generate input signals from either the flat panel side or the flat panel display side. As an example, where the aforementioned computing device is a notebook computing device, even when the computing device is in a closed orientation, it may receive input signals via the flat panel side of the electromagnetic digitizer. For example, the computing device may be in a state responsive to presence of the stylus such that a note may be readily recorded (e.g., without having to open the computing device).

As an example, where an electromagnetic digitizer panel is disposed between a flat panel display and a flat panel, the flat panel may include a cholesteric liquid crystal display that can receive input and visually retain that input on the cholesteric liquid crystal display, for example, without a need for power. For example, a user may draw on the cholesteric display with or without an electromagnetic stylus. In such an example, a note, a drawing, etc. may be recorded or not depending on the state of the electromagnetic digitizer panel and associated circuitry. Where the electromagnetic digitizer panel and the associated circuitry are in an operational state and where the user uses an appropriate stylus for input, drawing, etc. may generate input signals that may be recorded (e.g., stored in memory).

As an example, circuitry of a computing device may be in a detection state such that detection of a stylus causes transition of the circuitry to a recording state. As an example, a control region may respond to an input signal via a stylus, for example, to cause recording of digitized input signals (e.g., a note, a drawing, etc.). As an example, a button or other actuation mechanism may be provided that can, upon actuation, transition digitizer circuitry to a detection state, a recording state, etc.

As an example, an electromagnetic digitizer panel may be shared for input via either of two sides of the panel. As an example, an electromagnetic digitizer panel may be folded to form an interior side and an exterior side where the exterior side may form a first portion and a second portion with respect to a fold. In such an example, the first portion may be positioned for input via a flat panel display side and the second portion may be positioned for input via a flat panel side (e.g., a flat panel side that may or may not include a display). As an example, an electromagnetic shield may be disposed next to an interior side of a folded electromagnetic digitizer panel, for example, to shield one or more components (e.g., disposed at least partially between folded portions).

As an example, a computing device may include an electromagnetic digitizer panel housed in a housing where clearance exists between an edge of the electromagnetic digitizer panel and an edge of the housing for locating one or more components, which may be, for example, sensitive to electromagnetic energy associated with operation of the electromagnetic digitizer panel. As an example, a computing device may include components in a perimeter arrangement, for example, where a battery may be sandwiched between a flat panel display and a flat panel interior to a folded electromagnetic digitizer panel (e.g., consider a digitizer wrapped around the battery while still being configured for input from a flat panel display side and a flat panel side).

FIG. 1 shows examples of arrangements of panels 102, 104 and 106. Each of the arrangements 102, 104 and 106 is shown along with a Cartesian coordinate system that includes x, y and z axes. Various features of the arrangements 102, 104 and 106 may be described with respect to the Cartesian coordinate system. For example, length (e.g., along a y-axis), width (e.g., along an x-axis), depth (e.g., along a z-axis), aspect ratios, relationships between features, etc. may be described with respect to the Cartesian coordinate system.

In FIG. 1, the arrangement 102 includes a flat panel 112, an electromagnetic digitizer panel 122, a stylus 128 and electromagnetic digitizer circuitry 120. In the arrangement 102, energy is induced in a resonant circuit of the stylus 128 by a field generated by the electromagnetic digitizer panel 122. The resonant circuit of the stylus 128 then makes use of this energy to return a signal to the electromagnetic digitizer panel 122 where input signals may determine, for example, coordinate position, angle, speed, writing pressure, etc. As shown in FIG. 1, circuitry may be configured to switch a field on and off and to receive input signals.

As an example, an electromagnetic digitizer panel may include a sheet manufactured from glass epoxy resin or from a polyimide and PET formed film in which a large number of overlapping loop coils are arranged in a matrix in the x and y axis directions. Where an electromagnetic digitizer panel as in the arrangement 102 is configured for input from one side only, an opposing side may be shielded.

As an example, the circuitry 120 may discharge alternating current to selected loop coils from among the array of the electromagnetic digitizer panel 122 to excite the coils, causing them to generate fields. When the stylus 128 passes through these fields, it picks up and stores energy in its resonant circuit. As an example, the circuitry 120 may detect an approximate location of the stylus 128, for example, by scanning the loop coils, which may include scanning multiple loop coils in the vicinity of approximate location of the stylus 128 to determine coordinate values more precisely.

In the arrangement 102, location of the stylus 128 may be determined, for example, where the stylus 128 may be positioned a short distance from the electromagnetic digitizer panel 122 (e.g., an effective operational distance). As shown in the arrangement 102, while the flat panel 112 has some thickness, the stylus 128 can still be used for input via interactions with the electromagnetic digitizer panel 128.

As an example, the circuitry 120 may include a DSP circuit for processing input. As an example, the circuitry 120 may be operatively coupled to a processor of a device (e.g., CPU, etc.). As an example, the circuitry 120 may include a DSP circuit and be operatively coupled to a processor of a device.

As an example, a computing device such as a notebook computing device, a tablet computing device, etc. may include an arrangement of components such as those of the arrangement 104 of FIG. 1. As shown, the arrangement 104 includes the electromagnetic digitizer panel 122 and an LCD flat panel display 132 with associated LCD driver circuitry 130. As an example, the LCD driver circuitry may include one or more features of circuitry such as that of the Samsung WiseView™ driver circuitry or other suitable driver circuitry. While LCD may be an acronym for "liquid crystal display", LCD finds uses as "LCD display", for example, as an adjective for "display" (e.g., a type of display).

As an example, a computing device such as a notebook computing device, a tablet computing device, etc. may include an arrangement of components such as those of the arrangement 106 of FIG. 1. As shown, the arrangement 106 includes an electromagnetic digitizer panel 162, an LCD flat panel display 132 with associated LCD driver circuitry 130 and a flat panel 142 where input signals may be generated and received via the LCD flat panel display side of the electromagnetic digitizer panel 162 and via the flat panel side of the electromagnetic digitizer panel 162. In the example of FIG. 1, the arrangement 106 include electromagnetic digitizer circuitry 160 configured for input signals from either side of the electromagnetic digitizer panel 162 as well as LCD driver circuitry 130 and, for example, optionally other circuitry 140. As an example, the flat panel 142 may be a protective panel to protect the electromagnetic digitizer panel 162 from damage (e.g., contact, abrasion, etc.).

Figure 2:
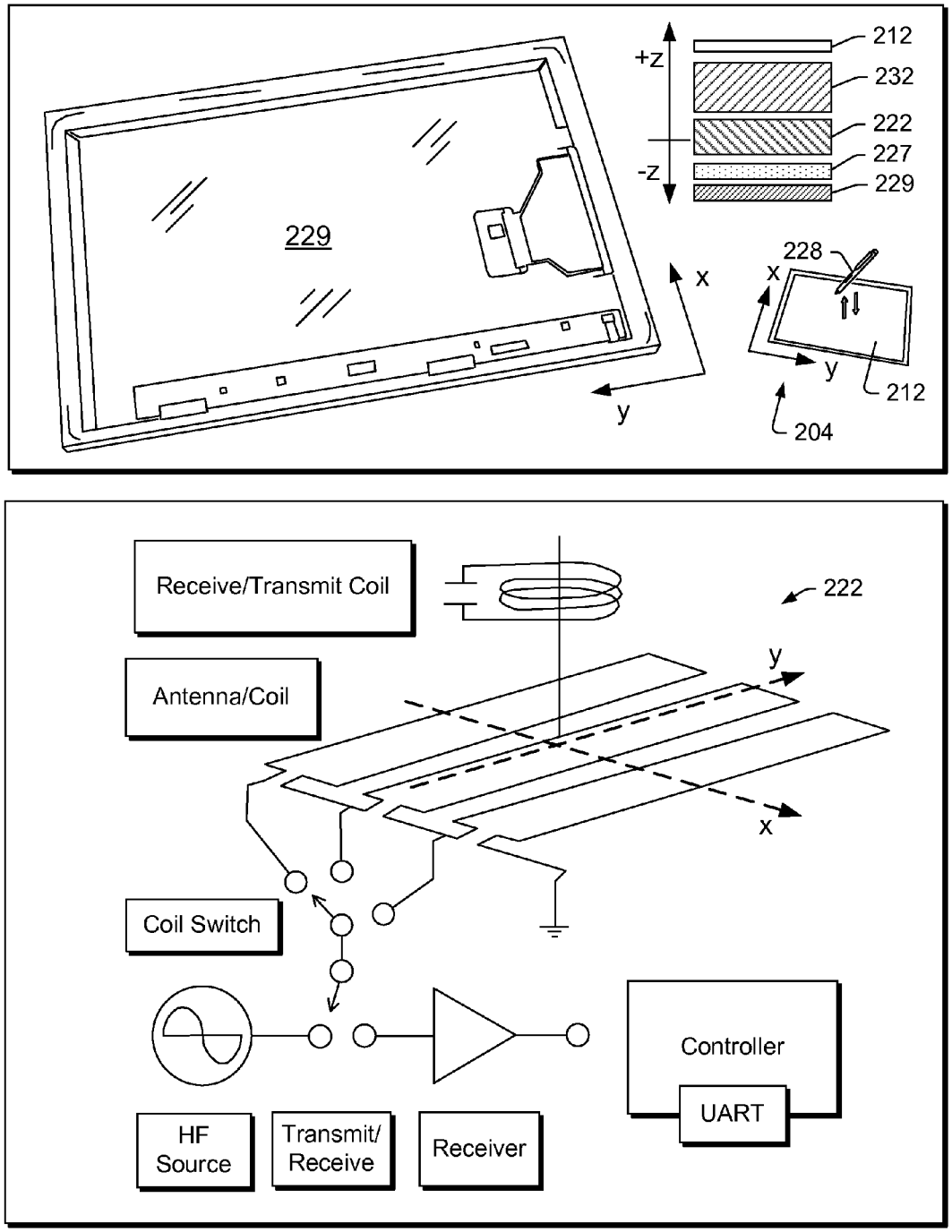
FIG. 2 is a diagram of an example of a device that includes an electromagnetic digitizer panel.

FIG. 2 shows an example of a device 204 that includes an electromagnetic digitizer panel 222. As shown in FIG. 2, the device 204 may include a stack of components, materials, etc. For example, from a lower position to a higher position, the stack includes a shield 229, adhesive 227, the electromagnetic digitizer panel 222, an LCD display panel 232 and a cover panel 212, for example, to protect the LCD display panel 232. As an example, the layers 229, 227 and 222 may have a thickness of the order of a few millimeters or less (e.g., optionally about 0.6 mm or less).

FIG. 2 shows various circuitry associated with the electromagnetic digitizer panel 222, for example, as explained with respect to the arrangement 102 of FIG. 1. As shown, a controller may include a serial port (e.g., UART), for example, for outputting information based on input via the electromagnetic digitizer panel 222.

Figure 3:
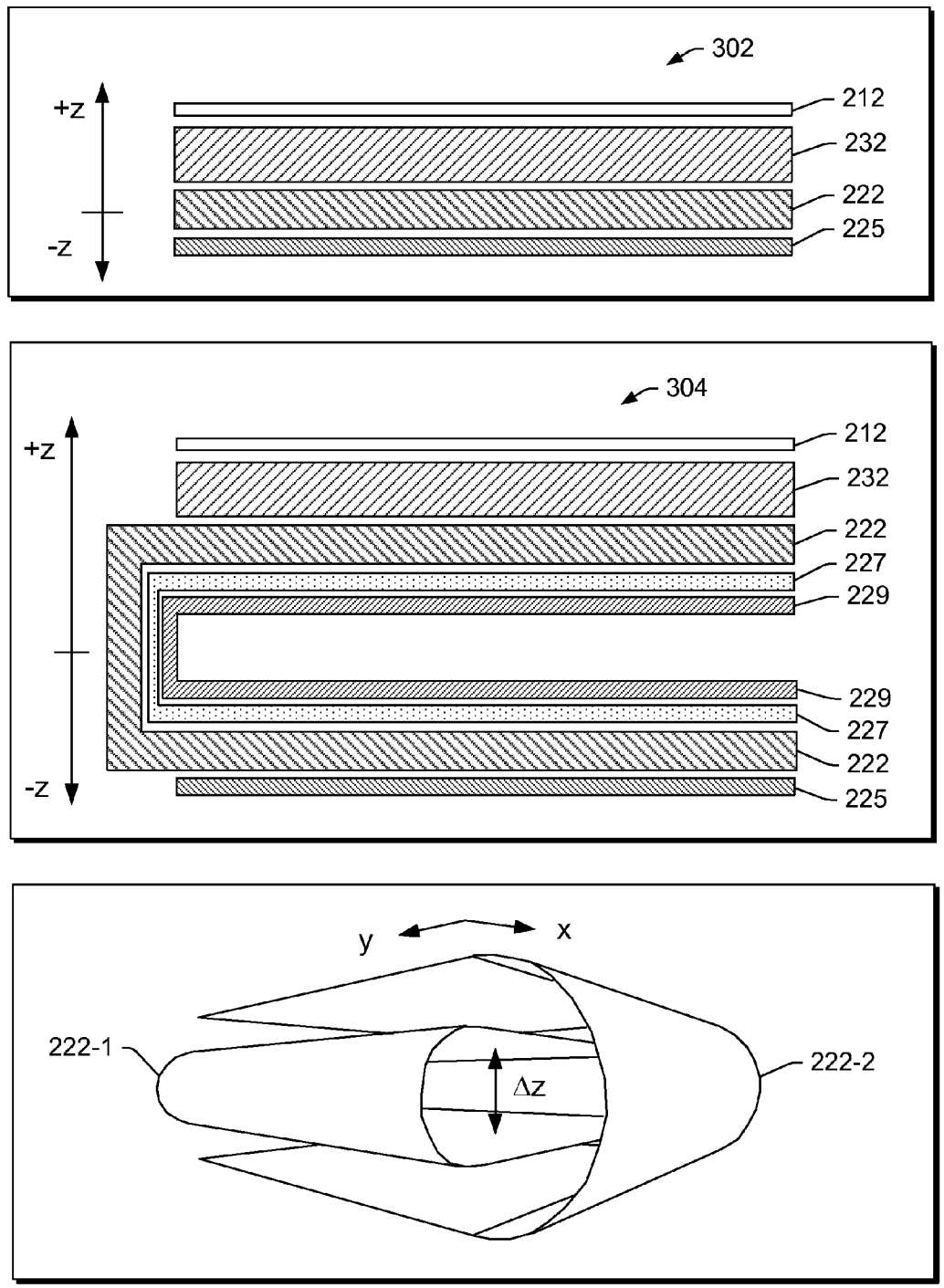
FIG. 3 is a diagram of examples of arrangements of panels.

FIG. 3 shows examples of arrangements of panels 302 and 304. The example arrangement 302 includes a flat panel 225, an electromagnetic digitizer panel 222, an LCD flat panel 232 and a cover panel 212, which may be configured for input to the electromagnetic digitizer panel 222 via the LCD flat panel side or the flat panel side.

The example arrangement 304 includes a folded electromagnetic digitizer panel 222 and optionally a shield or shields 229, which may, for example, be adhered to the electromagnetic digitizer panel 222 via adhesive 227. In the example arrangement 304, the fold defines two portions of the electromagnetic digitizer panel 222, each of which may receive input via interactions with a stylus. As an example, an interior space or cavity may exist between the two portions of the electromagnetic digitizer panel 222. One or more components may optionally be positioned within such a space or cavity (e.g., battery, circuits, etc.).

FIG. 3 also shows an example of a folded arrangement that includes two electromagnetic digitizer panel portions 222-1 and 222-2. In such an example, one portion 222-1 may provide wires oriented along an x-direction while the other portion 222-2 may provide wires oriented along a y-direction (e.g., or vice versa, or diagonal, etc.). In FIG. 3, an interior space or cavity (see, e.g., Δz) may be configured to accommodate one or more components, for example, optionally with shielding (e.g., one or more shield layers). As an example, a component may be a battery, a circuit, etc.

As an example, for a folded arrangement of an electromagnetic digitizer, two rectangular panels may be provided, for example, each with an array of wires running in one direction. In such an example, a first panel may be creased in approximately at its middle at a right angle to the wires (e.g., parallel to a short axis), and, for example, wrapped around a battery; and a second panel may be creased similarly and wrapped around the battery oriented approximately 90 degrees relative to the first panel. In such a manner (e.g., a method of construction), a grid of X and Y lines may be formed on both sides of the battery.

Figure 4:
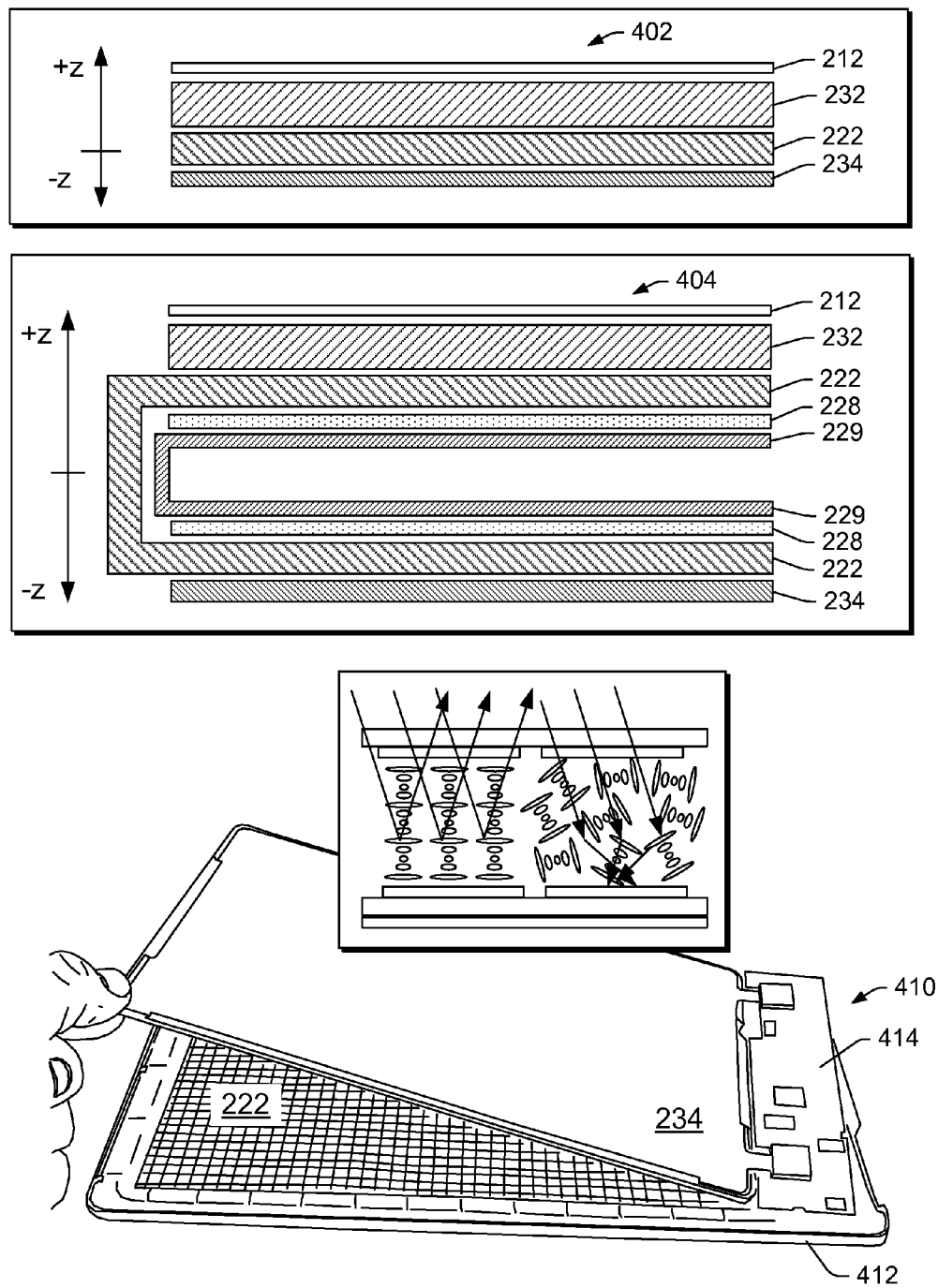
FIG. 4 is a diagram of examples of arrangements of panels.

FIG. 4 shows examples of arrangements of panels 402 and 404 and an example of a cholesteric LCD display panel 234 with respect to an electromagnetic digitizer panel 222. The example arrangement 402 includes a cholesteric LCD flat panel 234, an electromagnetic digitizer panel 222, an LCD flat panel 232 and a cover panel 212, which may be configured for input to the electromagnetic digitizer panel 222 via the LCD flat panel side or the cholesteric LCD flat panel side.

The example arrangement 404 includes a folded electromagnetic digitizer panel 222 and optionally a shield or shields 229, which may, for example, be adhered to the electromagnetic digitizer panel 222 via adhesive 227. In the example arrangement 404, the fold defines two portions of the electromagnetic digitizer panel 222, each of which may receive input via interactions with a stylus. As an example, an interior space or cavity may exist between the two portions of the electromagnetic digitizer panel 222. One or more components may optionally be positioned within such a space or cavity (e.g., battery, circuits, etc.).

As shown in FIG. 4, the cholesteric LCD display panel 234 may be positioned directly adjacent one side (e.g., or one portion or segment) of the electromagnetic digitizer panel 222. The panels 222 and 234 may be part of a computing device 410 that includes a housing 412 and circuitry 414. For example, the circuitry 414 may include circuitry to apply electricity to the cholesteric LCD display panel 234 to rearrange the cholesteric liquid crystals to "erase" markings made to the cholesteric LCD display. As an example, the circuitry 414 may include circuitry to record coordinate locations, representations thereof, etc. as made to the cholesteric LCD display panel 234 by direct physical contact with the cholesteric LCD display panel 234 via a stylus.

As an example, a cholesteric LCD display panel includes chiral nematic liquid crystals (e.g., chiral nematic liquid crystals, nematic liquid crystals with addition of chiral agent, etc.). Such a display panel may provide for a reflection state and, locally, a non-reflection state. For example, an approximate diagram in FIG. 4 shows a reflection state and a non-reflection or transmission state. As an example, application of force via finger, a stylus or other instrument may orient liquid crystals of a cholesteric LCD display panel in a non-reflection or transmission state such that "markings" appear. As an example, electricity may be applied to reorient crystals in a non-reflection state or transmission state to a reflection state (e.g., to "erase" the markings). For example, in the approximate diagram of FIG. 4, the liquid crystals may be disposed between a glass layer and another layer (e.g., glass or other material optionally with an absorption layer) where transparent indium tin oxide (ITO) electrodes are also disposed between the glass layer and the other layer to apply electricity to reorient the crystals. As an example, a cholesteric LCD panel may include one or more polymer stabilizers, features for color(s), etc.

Figure 5:
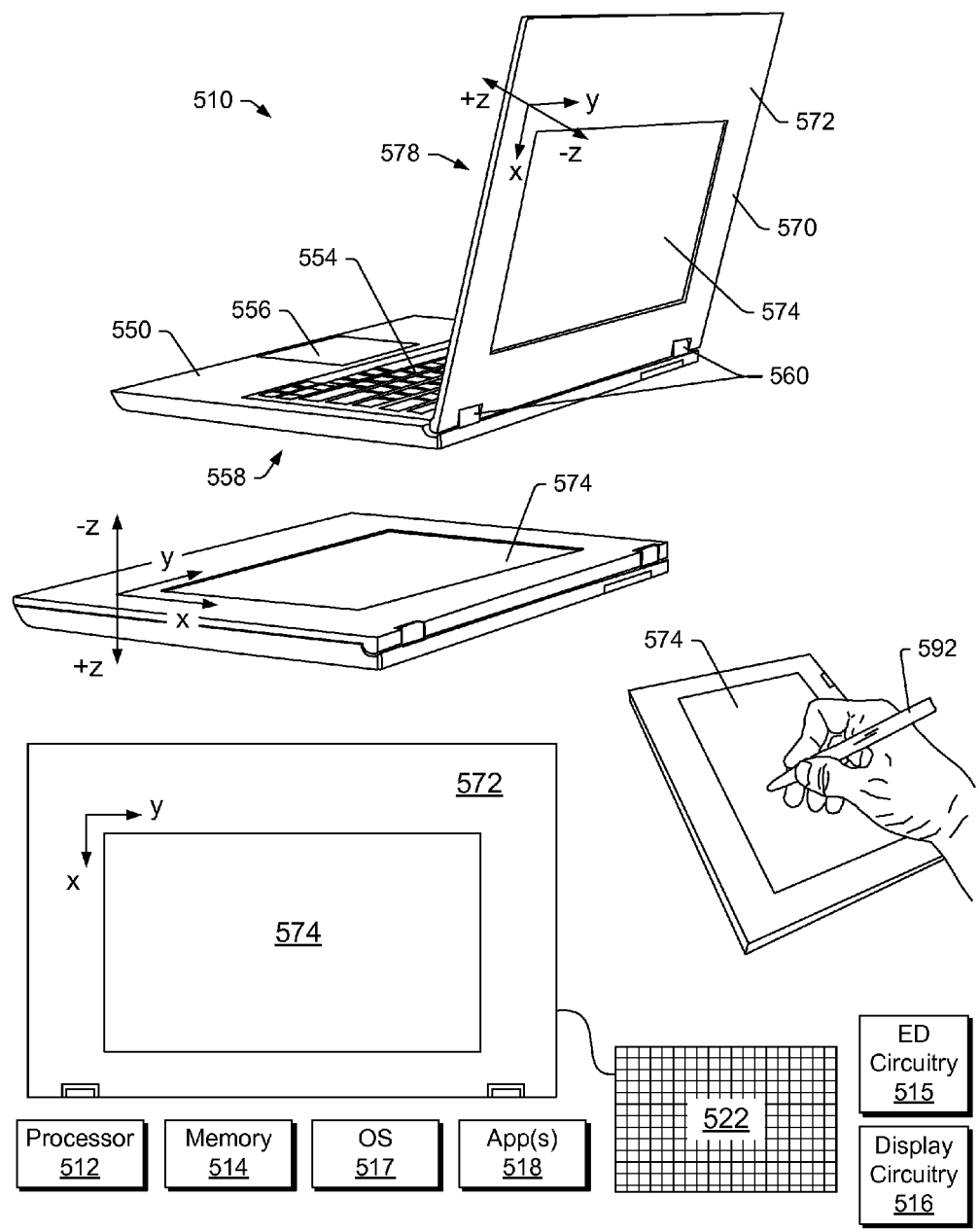
FIG. 5 is a diagram of an example of a device that includes an electromagnetic digitizer panel.

FIG. 5 shows an example of a device 510 that includes an electromagnetic digitizer panel 522 disposed in a portion 570 of the device 510 (e.g., an A portion). As an example, the device 510 can include a processor 512, memory 514, an operating system 517, one or more applications 518, electromagnetic digitizer circuitry 515 and display circuitry 516 (e.g., for a flat panel display).

As shown in the example of FIG. 5, the device 510 includes a portion 550 (e.g., a B portion) that includes a keyboard 554 and a touchpad 556 on one side, opposite a base side 558 of the portion 550, that is operatively coupled to the portion 570 via one or more hinges 560. The portion 570 includes, on one side, a surface 572 with a region 574 for input of signals via a stylus 592. On an opposing side 578, the portion 570 includes an LCD display, for example, where input of signals may be generated via the stylus 592. As an example, the region 574 may be a region of a cholesteric LCD display panel. The device 510 may include an arrangement of components, for example, as in the arrangements 302, 304, 402 or 404.

As an example, one or more of the one or more applications 518 may execute in an operating system environment established by the processor 512 using the operating system 517 to receive input from the electromagnetic digitizer circuitry 515 originating from the flat panel display side 578 of the electromagnetic digitizer panel 522 (e.g., via interactions with the stylus 592) and to receive input from the electromagnetic digitizer circuitry 515 originating from the region 574 side of the electromagnetic digitizer panel 522 (e.g., via interactions with the stylus 592).

As an example, a stylus may include multiple modes, for example, a mode for one side and a mode for another side of an electromagnetic digitizer panel. Such modes may be controlled by circuitry of a stylus, for example, to provide for different inputs for each side (e.g., pen style, resolution, etc.). As an example, a stylus may include one or more control buttons or other actuators (e.g., for controlling mode, circuitry, etc.).

As an example, where a medium such as paper is positioned over the region 574 of the device 510, a stylus may include ink or other material to make markings on the paper. Such a stylus may include a non-ink mode, for example, to avoid making markings on a LCD display side (e.g., an LCD display side with an LCD display panel driven by LCD driver circuitry to render information to the LCD display).

Figure 6:
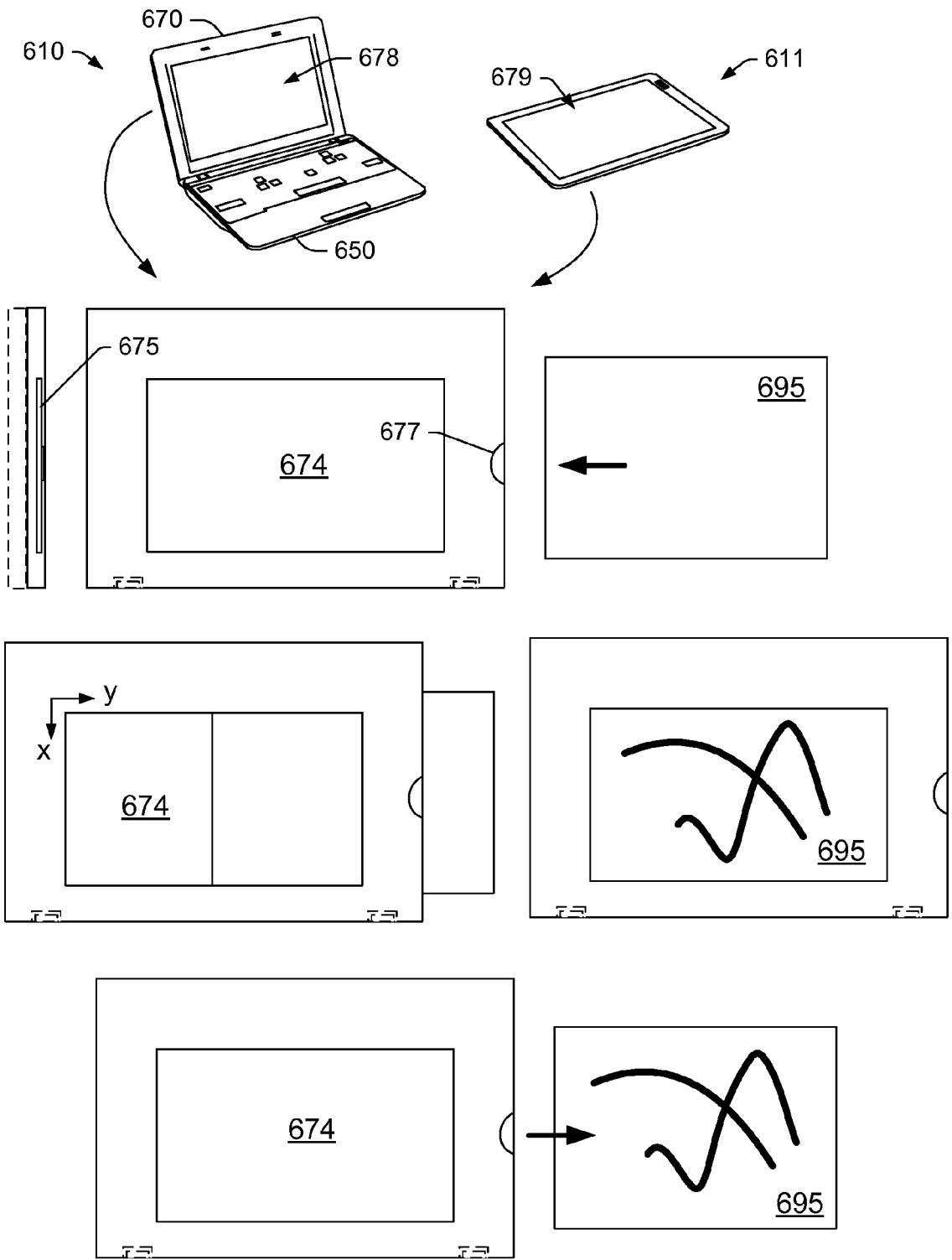
FIG. 6 is a diagram of example of devices that include an electromagnetic digitizer panel and an example of a method.

FIG. 6 shows examples of devices 610 and 611 that include an electromagnetic digitizer panel and an example of a method of using such devices. As shown, the device 610 may include a first portion 650 and a second portion 670 with a display 678 and the device 611 may include a display 678. On a side opposite the display 678 of the device 610 or on a side opposite the display 679 of the device 611, the device 610 and the device 611 may include a region 674 for receipt of input using a stylus that interacts with an electromagnetic digitizer panel disposed in the portion 670 of the device 610 or disposed in the device 611. As an example, the region 674 may have an area that is less than an area of the electromagnetic digitizer panel. As an example, an electromagnetic digitizer panel may have an area (e.g., length by width) that is less than that of a housing of the device 610 or a housing of the device 611. In such examples, one or more circuits may be positioned in a perimeter region defined by a clearance or clearances between the electromagnetic digitizer panel and the housing.

In the examples of FIG. 6, the region 674 may be a recessed region that includes a slot 675 and optionally a cutout 677. As shown a piece of paper 695 or other media may be received by the slot 675 to position the paper 695 over the region 674. As an example, a stylus may include ink (e.g., or other material) that can mark on the paper 695. In such an example, markings made on the paper 695 may be registered by the electromagnetic digitizer panel (e.g., per one of the arrangements 302, 304, 402, 404, etc.). As an example, the device 610 or the device 611 may store information as to such markings in memory, for example, for later display on the display 678 or the display 679. After making markings on the paper 695, the paper 695 may be removed, for example, by sliding it out via the slot 677. In such an example, a user may retain the paper as a "hard copy" of the markings. As an example, a user may edit the markings using an application that executes on the device 610, the device 611 or another device to which the stored information has been transferred. As desired, an edited version may be transmitted to a printer, etc., for example, if a hard copy of the edited version is desired.

As an example, the device 610 or the device 611 may include a sensor to sense presence of the paper 695 in the region 674 (e.g., as received via the slot 675). In such an example, the sensor may trigger a stand-by state of the device 610 or the device 611 for purposes of activating circuitry associated with an electromagnetic digitizer panel. For example, a method may include sliding a piece of paper into a device to cover a region configured for input via a stylus that responds to an electromagnetic digitizer panel, activating circuitry for such input, and receiving input via the stylus. In such an example, the method may further transition to a dormant state responsive to removal of the piece of paper.

As an example, rather than paper, a cholesteric LCD display panel may be received by the device 610 or the device 611. In such an example, the device 610 or the device 611 may optionally include circuitry to "erase" markings made to the cholesteric LCD display panel. As an example, a method may include receiving a cholesteric LCD display panel, marking the cholesteric LCD display panel with a stylus and recording input signals associated with the markings and removing the cholesteric LCD display panel, for example, to retain a hard copy of the markings, which may optionally be erased by application of electricity to the cholesteric LCD display panel or via another mechanism that re-arranges the cholesteric liquid crystals.

As an example, a cholesteric LCD display may be covered with a sliding or rolling door made of semi-rigid material. For example, consider a region with such a display and a slotted portion to receive a cover (e.g., where the region 674 is a cholesteric LCD display and the sheet 695 is a cover). In such an example, a cholesteric LCD display may be accessed by mechanically sliding the cover away from a writing surface (e.g., input region). Such an approach may help to protect a pressure-sensitive cholesteric LCD from inadvertent markings when storing or transporting a device.

As an example, by opening a cover door, a cholesteric LCD display may be accessible for removal, for example, to allow a user to detach the writing surface for remote operation or change-out. As an example, a replacement surface (e.g., a tile or tiles) may be placed into the device, such as an opaque surface with a paper-attachment means for capturing true ink-on-paper writing. As an example, a device may include a holder for holding media where the media may be, for example, a sheet of paper, a cholesteric LCD display, etc.

Figure 7:
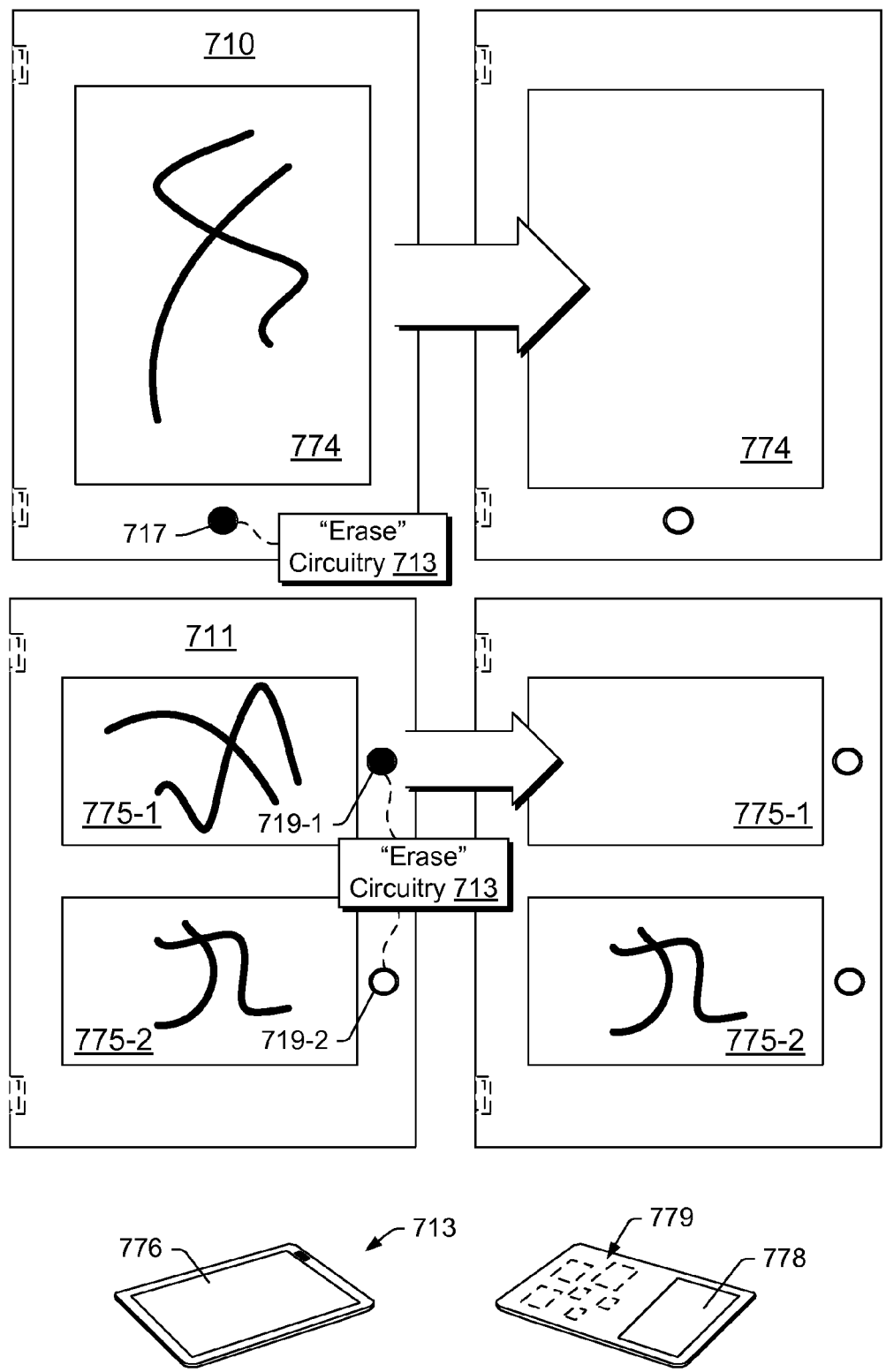
FIG. 7 is a diagram of examples of devices that include an electromagnetic digitizer panel and examples of methods.

FIG. 7 shows examples of devices 710, 711 and 713 that include an electromagnetic digitizer panel and also shows some examples of methods. As shown in FIG. 7, the device 710 includes erase circuitry 713 operatively coupled to a button 717 or, for example, a portion of a region 774 (e.g., at or near an edge, a corner, etc.) where the button 717 (e.g., or portion of the region 774) may be actuated to erase markings made to the region 774. For example, the region 774 may be a region of a cholesteric LCD display panel that includes electrodes to reorient crystals responsive to actuation of the button 717, a portion of the region 774, etc. As an example, the button 717 may provide for actuation of circuitry such as detection circuitry, recording circuitry, etc. (e.g., optionally alternative to or optionally in addition to erase circuitry). For example, the button 717 may erase markings by activating the erase circuitry 713 and transition detection circuitry for detection of a stylus (e.g., for inputting information, etc.).

As shown in FIG. 7, the device 711 includes erase circuitry 713 operatively coupled to buttons 719-1 and 719-2 or, for example, a portion of a region 775-1 and a portion of the region 775-2 (e.g., at or near an edge, a corner, etc.) where either of the buttons 719-1 and 719-2 (e.g., or portion of the region 775-1 or 775-2) may be actuated to erase markings made to the region 775-1 or 775-2, respectively. For example, the regions 775-1 and 775-2 may be regions of one or more cholesteric LCD display panels that include electrodes to reorient crystals. As shown in the example of FIG. 7, the device 711 may retain one drawing (e.g., markings, notes, etc.) while erasing another. Such an approach can provide a user with various options, for example, keeping track of information during the day in one region while taking periodic notes in another region, which may be erased, optionally with capture of such notes to memory.

As an example, the button 719-1 and the button 719-2 may provide for actuation of circuitry such as detection circuitry, recording circuitry, etc. (e.g., optionally alternative to or optionally in addition to erase circuitry). For example, the button 719-1 and the button 719-2 may erase markings by activating the erase circuitry 713 and transition detection circuitry for detection of a stylus (e.g., for inputting information, etc.).

As an example, a device may include a region for input to an electromagnetic digitizer panel that occupies less than about 80% of an area of a surface of the device. For example, the device 711 may include one of the regions 775-1 or 775-2. In such an example, a portion of an electromagnetic digitizer panel may be shielded on one side, for example, for locating one or more components, such that one side of the electromagnetic digitizer panel is available for input via a stylus over an area that exceeds that is available for input via a stylus on an opposing side of the electromagnetic digitizer panel. As an example, the device 711 may include shielding in one or more regions, for example, between the two regions 775-1 and 775-2, between one of the regions and an edge of the device 711, etc. In such an example, one or more components may be positioned in a shielded region.

As an example, the device 713 may have a tablet form factor with an LCD display 776 on one side (e.g., for rendering information via a processor, graphics processor, etc.) and a region 778 on an opposing side where an electromagnetic digitizer panel disposed between the two sides can receive input via a stylus from approximately a full extent of the LCD display 776 and can receive input via a stylus from the region 778 on the opposing side, which may have an area less than that of the LCD display 776. In such an example, components 779 sensitive to fields associated with the electromagnetic digitizer panel (e.g., and stylus) may be positioned behind a shielded portion of the electromagnetic digitizer panel where that shielded portion is unavailable for input from the side opposite that of the LCD display 776. For example, a tablet form factor may call for a particular LCD display size (e.g., area) with a corresponding electromagnetic digitizer panel where associated circuitry for processing information, storing information, rendering information to the LCD display, etc. may be located in a smaller area. In such an example, the "free" area (e.g., display area minus circuitry area) may be available for input via a stylus on a side opposite the display side of the tablet.

Figure 8:
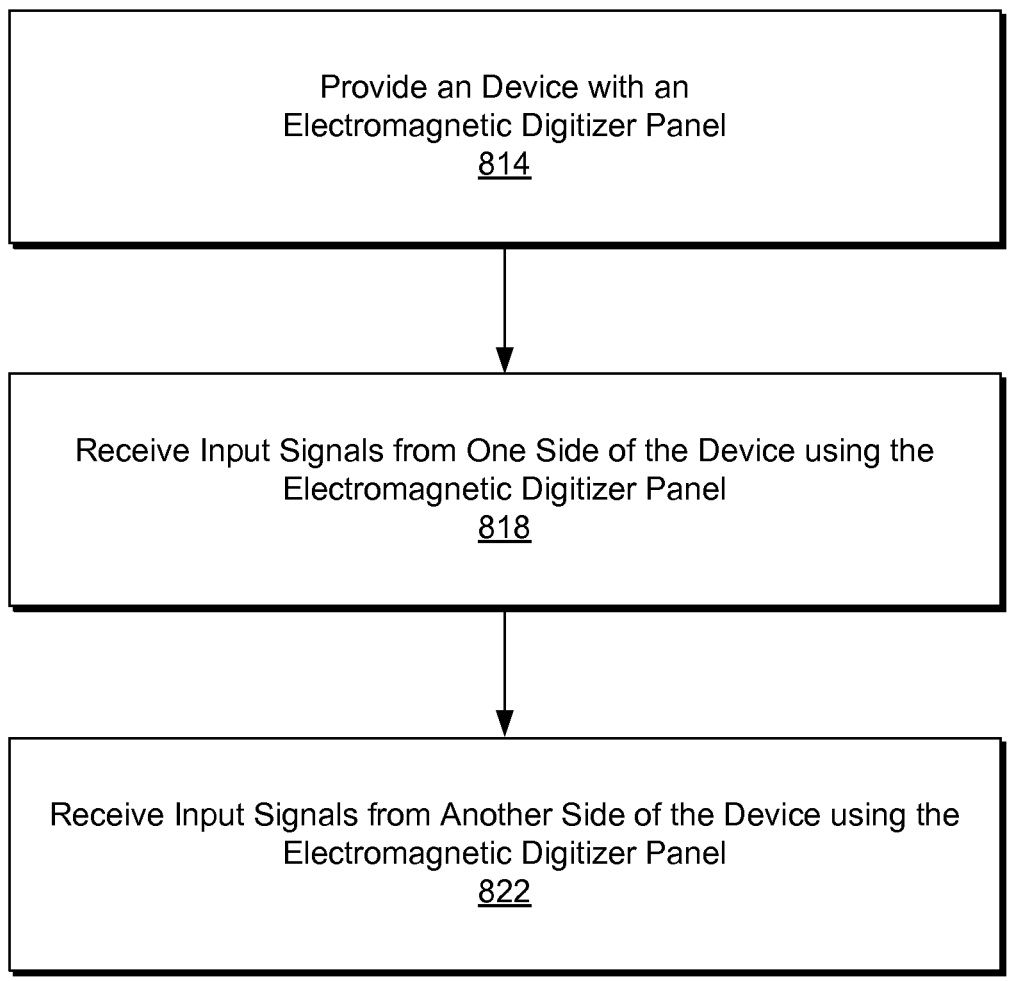
FIG. 8 is a diagram of an example of a method.

FIG. 8 shows an example of a method 810 that includes a provision block 814 for providing a device with an electromagnetic digitizer panel, a reception block 818 for receiving input signals from one side of the device using the electromagnetic digitizer panel and a reception block 822 for receiving input signals from another side of the device using the electromagnetic digitizer panel. As an example, the device may include an arrangement of panels as shown in FIG. 3, FIG. 4, FIG. 5, FIG. 6 or FIG. 7 or otherwise described herein. As an example, the method 810 may include shielding one or more components, erasing markings by applying electricity to a cholesteric LCD display panel, storing information based at least in part on input signals from one or both sides of the device, rendering information to a LCD display panel using display driver circuitry, transitioning from one state to another state (e.g., responsive to detection of a stylus, etc.), powering on circuitry associated with the electromagnetic digitizer panel, powering off circuitry associated with the electromagnetic digitizer panel, entering a low power state for circuitry associated with the electromagnetic digitizer panel, exiting (e.g., waking) from a low power state for circuitry associated with the electromagnetic digitizer panel, etc.

As an example, an apparatus can include a flat panel, a flat panel display, an electromagnetic digitizer panel disposed at least partially between the flat panel and the flat panel display and circuitry to digitize input signals from a flat panel side of the electromagnetic digitizer panel and to digitize input signals from a flat panel display side of the electromagnetic digitizer panel. In such an example, the flat panel display may be a liquid crystal display and the apparatus may include liquid crystal display driver circuitry, for example, for rendering information to the flat panel display. As an example, a flat panel display may include indium tin oxide (ITO) electrodes. As an example, an apparatus may include a cholesteric liquid crystal display (e.g., in addition to a LCD display). As an example, a cholesteric liquid crystal display may be configured with ITO electrodes for applying electricity to orient (e.g., reorient) liquid crystals.

As an example, an apparatus may include a flat panel that includes a sheet holder (e.g., a slot, a clip, etc.). For example, such a sheet holder may hold a sheet of paper, a cholesteric liquid crystal display panel, etc.

As an example, an apparatus may include an electromagnetic digitizer panel that includes a fold that defines a first portion and a second portion of the electromagnetic digitizer panel. In such an example, a flat panel, the first portion of the electromagnetic digitizer panel, the second portion of the electromagnetic digitizer panel and a flat panel display may form a stack. As an example, for a folded electromagnetic digitizer panel, at least one electromagnetic shield may be disposed between a first portion and a second portion of the electromagnetic digitizer panel.

As an example, an apparatus may include a connector for operatively coupling the apparatus to another apparatus, for example, where the other apparatus may include a keyboard (e.g., consider a notebook form factor, a tablet form factor with an accessory keyboard, etc.).

As an example, an apparatus may include a stylus with circuitry for interacting with an electromagnetic digitizer panel. As an example, an apparatus may include one or more stylus holders (e.g., clips, sockets, etc.).

As an example, an apparatus may include a flat panel display with a display area and a flat panel with an input region area (e.g., for input to an electromagnetic digitizer panel) that is less than the display area.

As an example, an apparatus can include a processor; memory operatively coupled to the processor; a first portion that includes a flat panel, a flat panel display and an electromagnetic digitizer panel disposed at least partially between the flat panel and the flat panel display; a second portion that includes a keyboard where the first portion and the second portion are operatively coupled to each other; and circuitry to digitize input signals from a flat panel side of the electromagnetic digitizer panel and to digitize input signals from a flat panel display side of the electromagnetic digitizer panel. In such an example, the flat panel display can include liquid crystals and liquid crystal display driver circuitry operatively coupled to the processor.

As an example, a flat panel may include a cholesteric liquid crystal display. As an example, an apparatus with a notebook form factor, a tablet form factor or other form factor may include a sheet holder. As an example, for a notebook form factor, a display portion may include a sheet holder.

As an example, an electromagnetic digitizer panel can include a fold that defines a first segment and a second segment of the electromagnetic digitizer panel. In such an example, a flat panel, a first segment of the electromagnetic digitizer panel, the second segment of the electromagnetic digitizer panel and a panel display may form a stack.

As an example, an apparatus can include a processor; memory operatively coupled to the processor; a flat panel; a flat panel display; an electromagnetic digitizer panel disposed at least partially between the flat panel and the flat panel display; and circuitry to digitize input signals from a flat panel side of the electromagnetic digitizer panel and to digitize input signals from a flat panel display side of the electromagnetic digitizer panel. In such an example, the flat panel may include a detachable cholesteric liquid crystal display.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 9:
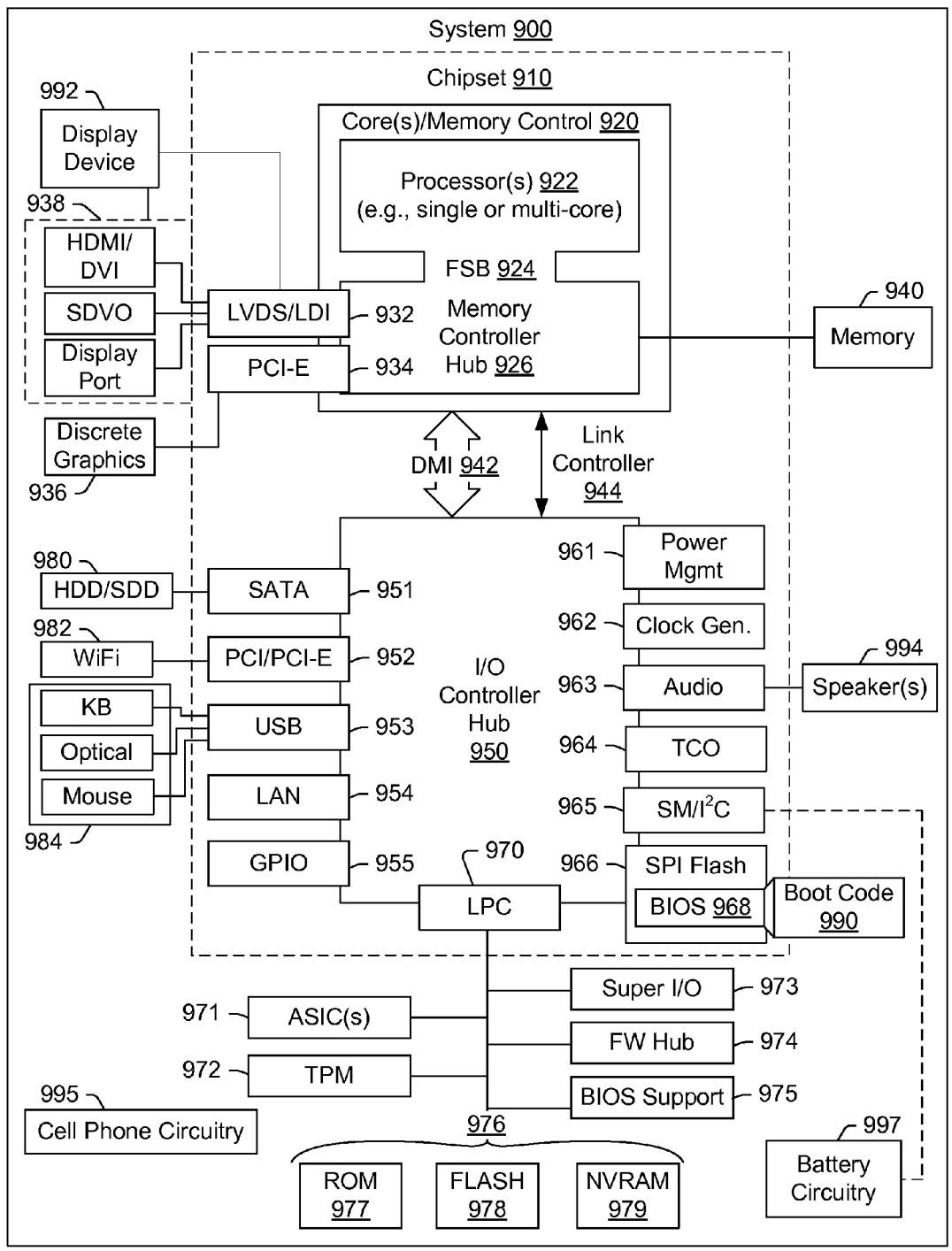
FIG. 9 is a diagram of an example of a system that includes one or more processors.

FIG. 9 depicts a block diagram of an illustrative computer system 900. The system 900 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C. As an example, a system such as one of the systems of the various figures may be configured to operate as a power adapter for an information handling system that may include at least some of the features of the system 900.

As shown in FIG. 9, the system 900 includes a so-called chipset 910. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 9, the chipset 910 has a particular architecture, which may vary to some extent depending on brand or manufacturer. The architecture of the chipset 910 includes a core and memory control group 920 and an I/O controller hub 950 that exchange information (e.g., data, signals, commands, etc.) via, for example, a direct management interface or direct media interface (DMI) 942 or a link controller 944. In the example of FIG. 9, the DMI 942 is a chip-to-chip interface (sometimes referred to as being a link between a "northbridge" and a "southbridge").

The core and memory control group 920 include one or more processors 922 (e.g., single core or multi-core) and a memory controller hub 926 that exchange information via a front side bus (FSB) 924. As described herein, various components of the core and memory control group 920 may be integrated onto a single processor die, for example, to make a chip that supplants the conventional "northbridge" style architecture.

The memory controller hub 926 interfaces with memory 940. For example, the memory controller hub 926 may provide support for DDR SDRAM memory (e.g., DDR, DDR2, DDR3, etc.). In general, the memory 940 is a type of random-access memory (RAM). It is often referred to as "system memory".

The memory controller hub 926 further includes a low-voltage differential signaling interface (LVDS) 932. The LVDS 932 may be a so-called LVDS Display Interface (LDI) for support of a display device 992 (e.g., a CRT, a flat panel, a projector, etc.). A block 938 includes some examples of technologies that may be supported via the LVDS interface 932 (e.g., serial digital video, HDMI/DVI, display port). The memory controller hub 926 also includes one or more PCI-express interfaces (PCI-E) 934, for example, for support of discrete graphics 936. Discrete graphics using a PCI-E interface has become an alternative approach to an accelerated graphics port (AGP). For example, the memory controller hub 926 may include a 16-lane (x16) PCI-E port for an external PCI-E-based graphics card. A system may include AGP or PCI-E for support of graphics. As described herein, a display may be a sensor display or touchscreen display (e.g., configured for receipt of input using a stylus, a finger, etc.). As described herein, a sensor display (e.g., a touchscreen display) may rely on resistive sensing, optical sensing, or other type of sensing.

The I/O hub controller 950 includes a variety of interfaces. The example of FIG. 9 includes a SATA interface 951, one or more PCI-E interfaces 952 (optionally one or more legacy PCI interfaces), one or more USB interfaces 953, a LAN interface 954 (more generally a network interface), a general purpose I/O interface (GPIO) 955, a low-pin count (LPC) interface 970, a power management interface 961, a clock generator interface 962, an audio interface 963 (e.g., for speakers 994), a total cost of operation (TCO) interface 964, a system management bus interface (e.g., a multi-master serial computer bus interface) 965, and a serial peripheral flash memory/controller interface (SPI Flash) 966, which, in the example of FIG. 9, includes BIOS 968 and boot code 990. With respect to network connections, the I/O hub controller 950 may include integrated gigabit Ethernet controller lines multiplexed with a PCI-E interface port. Other network features may operate independent of a PCI-E interface.

The interfaces of the I/O hub controller 950 provide for communication with various devices, networks, etc. For example, the SATA interface 951 provides for reading, writing or reading and writing information on one or more drives 980 such as HDDs, SDDs or a combination thereof. The I/O hub controller 950 may also include an advanced host controller interface (AHCI) to support one or more drives 980. The PCI-E interface 952 allows for wireless connections 982 to devices, networks, etc. The USB interface 953 provides for input devices 984 such as keyboards (KB), one or more optical sensors, mice and various other devices (e.g., microphones, cameras, phones, storage, media players, etc.). On or more other types of sensors may optionally rely on the USB interface 953 or another interface (e.g., I²C, etc.). As to microphones, the system 900 of FIG. 9 may include hardware (e.g., an audio card) appropriately configured for receipt of sound (e.g., user voice, ambient sound, etc.).

In the example of FIG. 9, the LPC interface 970 provides for use of one or more ASICs 971, a trusted platform module (TPM) 972, a super I/O 973, a firmware hub 974, BIOS support 975 as well as various types of memory 976 such as ROM 977, Flash 978, and non-volatile RAM (NVRAM) 979. With respect to the TPM 972, this module may be in the form of a chip that can be used to authenticate software and hardware devices. For example, a TPM may be capable of performing platform authentication and may be used to verify that a system seeking access is the expected system.

The system 900, upon power on, may be configured to execute boot code 990 for the BIOS 968, as stored within the SPI Flash 966, and thereafter processes data under the control of one or more operating systems and application software (e.g., stored in system memory 940). An operating system may be stored in any of a variety of locations and accessed, for example, according to instructions of the BIOS 968. Again, as described herein, a satellite, a base, a server or other machine may include fewer or more features than shown in the system 900 of FIG. 9. Further, the system 900 of FIG. 9 is shown as optionally including cell phone circuitry 995, which may include GSM, CDMA, etc., types of circuitry configured for coordinated operation with one or more of the other features of the system 900. Also shown in FIG. 9 is battery circuitry 997, which may provide one or more battery, power, etc., associated features (e.g., optionally to instruct one or more other components of the system 900). As mentioned, a SMBus may be operable via a LPC (see, e.g., the LPC interface 970), via an I²C interface (see, e.g., the SM/I²C interface 965), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
a housing that comprises opposing sides;
a flat panel that defines at least a portion of a first one of the opposing sides of the housing;
a flat panel display that defines at least a portion of a second one of the opposing sides of the housing;
an electromagnetic digitizer panel disposed at least partially between the flat panel and the flat panel display; and
circuitry that digitizes stylus input signals from a flat panel side of the electromagnetic digitizer panel and that digitizes stylus input signals from a flat panel display side of the electromagnetic digitizer panel.

2. The apparatus of claim 1 wherein the flat panel comprises a cholesteric liquid crystal display.

3. The apparatus of claim 1 wherein the flat panel display comprises a liquid crystal display and liquid crystal display driver circuitry.

4. The apparatus of claim 1 wherein the flat panel display comprises indium tin oxide (ITO) electrodes.

5. The apparatus of claim 1 wherein the flat panel comprises a sheet holder.

6. The apparatus of claim 1 wherein the electromagnetic digitizer panel comprises a fold that defines a first portion and a second portion of the electromagnetic digitizer panel.

7. The apparatus of claim 6 wherein the flat panel, the first portion of the electromagnetic digitizer panel, the second portion of the electromagnetic digitizer panel and the flat panel display form a stack.

8. The apparatus of claim 6 comprising at least one electromagnetic shield disposed between the first portion and the second portion of the electromagnetic digitizer panel.

9. The apparatus of claim 1 comprising a connector for operatively coupling the apparatus to another apparatus.

10. The apparatus of claim 9 further comprising the other apparatus wherein the other apparatus comprises a keyboard.

11. The apparatus of claim 1 further comprising the stylus wherein the stylus comprises circuitry for interacting with the electromagnetic digitizer panel.

12. The apparatus of claim 1 wherein a flat panel display comprises a display area and where the flat panel comprises an input region area that is less than the display area.

13. An apparatus comprising:
a processor;
memory operatively coupled to the processor;
a first portion that comprises
opposing sides,
a flat panel that defines at least a portion of a first one of the opposing sides,
a flat panel display that defines at least a portion of a second one of the opposing sides, and
an electromagnetic digitizer panel disposed at least partially between the flat panel and the flat panel display;
a second portion that comprises a keyboard wherein the first portion and the second portion are operatively coupled to each other; and
circuitry that digitizes stylus input signals from a flat panel side of the electromagnetic digitizer panel and that digitizes stylus input signals from a flat panel display side of the electromagnetic digitizer panel.

14. The apparatus of claim 13 wherein the flat panel comprises a cholesteric liquid crystal display.

15. The apparatus of claim 13 wherein the flat panel display comprises liquid crystals and liquid crystal display driver circuitry operatively coupled to the processor.

16. The apparatus of claim 13 wherein the first portion comprises a sheet holder.

17. The apparatus of claim 13 wherein the electromagnetic digitizer panel comprises a fold that defines a first segment and a second segment of the electromagnetic digitizer panel.

18. The apparatus of claim 17 wherein the flat panel, the first segment of the electromagnetic digitizer panel, the second segment of the electromagnetic digitizer panel and the flat panel display form a stack.

19. An apparatus comprising:
a processor;
memory operatively coupled to the processor;
a housing that comprises opposing sides;
a flat panel that defines at least a portion of a first one of the opposing sides of the housing;
a flat panel display that defines at least a portion of a second one of the opposing sides of the housing;
an electromagnetic digitizer panel operatively coupled to the processor and disposed at least partially between the flat panel and the flat panel display; and
circuitry that digitizes stylus input signals from a flat panel side of the electromagnetic digitizer panel and that digitizes stylus input signals from a flat panel display side of the electromagnetic digitizer panel.

20. The apparatus of claim 19 wherein the flat panel comprises a detachable cholesteric liquid crystal display.

* * * * *